United States Patent
Kato et al.

(10) Patent No.: US 6,203,121 B1
(45) Date of Patent: Mar. 20, 2001

(54) COEFFICIENT OF FRICTION PEAK ESTIMATION APPARATUS

(75) Inventors: Toshihisa Kato, Anjo; Yasuhiro Abe, Toyota, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/471,148

(22) Filed: Dec. 23, 1999

(30) Foreign Application Priority Data

Dec. 25, 1998 (JP) .................................................. 10-376682

(51) Int. Cl.$^7$ ............................... B60T 8/58; B60T 8/66; B60T 8/60; B60T 8/32
(52) U.S. Cl. ......................... 303/150; 188/181 A; 701/80; 303/177
(58) Field of Search ..................................... 303/150, 165, 303/163, 199, 176, 182, 183, 177, 149, 148, 166; 701/80, 90, 71, 70; 188/181 A; 73/9; 180/197

(56) References Cited

U.S. PATENT DOCUMENTS

| | | | |
|---|---|---|---|
| 3,871,715 | * | 3/1975 | Hikida et al. . |
| 4,779,447 | * | 10/1988 | Rath ...................................... 303/150 |
| 4,855,917 | * | 8/1989 | Sawano et al. ....................... 303/150 |
| 4,947,332 | * | 8/1990 | Ghoneim ............................... 180/197 |
| 4,984,165 | * | 1/1991 | Müller et al. ......................... 303/150 |
| 5,123,715 | * | 6/1992 | Okubo ................................... 303/150 |
| 5,135,290 | * | 8/1992 | Cao ....................................... 303/150 |
| 5,157,612 | * | 10/1992 | Satomi .................................. 303/150 |
| 5,249,851 | * | 10/1993 | Johnsen . |
| 5,251,137 | * | 10/1993 | Chin et al. . |
| 5,385,393 | * | 1/1995 | Tanaka et al. ........................ 303/150 |
| 5,411,322 | * | 5/1995 | Breen ................................... 303/150 |
| 5,411,325 | * | 5/1995 | Tanaka et al. ........................ 303/150 |
| 5,444,625 | * | 8/1995 | Tanaka et al. ........................ 701/90 |
| 5,482,360 | * | 1/1996 | Meier . |
| 5,513,907 | * | 5/1996 | Kiencke et al. ....................... 303/150 |
| 5,553,930 | * | 9/1996 | Rivaed et al. . |
| 5,906,650 | * | 5/1999 | Tsuno et al. ............................ 701/80 |
| 5,938,713 | * | 8/1999 | Miyazaki ............................... 303/150 |
| 6,045,198 | * | 4/2000 | Naito et al. ........................... 303/150 |
| 6,125,319 | * | 9/2000 | Hac et al. ............................. 303/150 |

FOREIGN PATENT DOCUMENTS

| | | | |
|---|---|---|---|
| 6463450 | * | 3/1989 | (JP) . |
| 1273758 | * | 11/1989 | (JP) . |
| 4-345567 | | 12/1992 | (JP) . |
| 7172278 | * | 7/1995 | (JP) . |
| 7174689 | * | 7/1995 | (JP) . |
| 8-150918 | | 6/1996 | (JP) . |
| 8-295223 | | 11/1996 | (JP) . |
| 1120654 | * | 1/1999 | (JP) . |

* cited by examiner

*Primary Examiner*—Douglas C. Butler
(74) *Attorney, Agent, or Firm*—Burns, Doane, Swecker & Mathis, LLP (57) ABSTRACT

The present invention is directed to an apparatus for estimating the peak of a coefficient of friction in a coefficient of friction—slip rate characteristic, wherein a wheel acceleration of each wheel of a vehicle is detected, and a vehicle acceleration of the vehicle is detected. A peak estimation device is provided for estimating the peak of the coefficient of friction, and adapted to determine that the coefficient of friction is the peak when the wheel acceleration is lower than the vehicle acceleration, by more than a predetermined difference. An anti-skid control system for an automotive vehicle may be formed to include the coefficient of friction peak estimation apparatus, and a reference speed setting device for setting a reference speed for initiating a pressure decrease mode on the basis of a wheel speed and a vehicle speed detected when the peak was detected. A pressure control device is disposed between a wheel brake cylinder and a pressure generator, to be controlled in response to at least the result of comparison between the wheel speed and the reference speed.

4 Claims, 6 Drawing Sheets

COEFFICIENT OF FRICTION PEAK ESTIMATION APPARATUS

This application claims priority under 35 U.S.C. Sec. 119 to No.10-376682 filed in Japan on Dec. 25, 1998, the entire content of which is herein incorporated by reference.

BACKGROUND OF THE INVENTION

1. Field of the Invention

The present invention relates to a coefficient of friction peak estimation apparatus for estimating the peak of a coefficient of friction in a coefficient of friction—slip rate characteristic, and relates to an anti-skid control system having the coefficient of friction peak estimation apparatus to control a hydraulic braking pressure in each wheel brake cylinder in response to a wheel speed detected when the peak of the coefficient of friction is estimated.

2. Description of the Related Arts

Various anti-skid control systems have been proposed heretofore to prevent a wheel from being locked during a braking operation of a vehicle. For example, Japanese Patent Laid-open Publication No.8-150918 discloses an anti-skid control system which is adapted to compare a wheel acceleration with a vehicle acceleration at a predetermined time, and adjust a pressure increasing rate of braking pressure, based upon the result of comparison. According to that publication, in view of a prior anti-skid control system as disclosed in Japanese Patent Laid-open Publication No.4-345567, which was aimed to provide an appropriate pressure increasing rate in accordance with the slip rate under such a condition as the coefficient of friction of a road (abbreviated as a road $\mu$) or the like is constant, thereby to achieve an ideal braking force control, it was proposed to solve such a problem that the ideal braking force control could not necessarily be achieved by that prior anti-skid control system, when the condition such as the coefficient of friction of the road was varied, so that it is aimed to control the braking force in accordance with the coefficient of friction of the road.

Furthermore, in Japanese Patent Laid-open Publication No.8-295223, there is disclosed a vehicle speed estimation apparatus which is provided with means for determining whether a changing point of a property in a road coefficient of friction—slip rate characteristic was crossed, and adapted to change the estimation of a vehicle speed into the estimation of the vehicle speed on the basis of an estimated vehicle deceleration calculated by vehicle speed estimation means, and also disclosed is the anti-skid brake system having the vehicle speed estimation apparatus.

According to the vehicle speed estimation apparatus as disclosed in the above Japanese Patent Laid-open Publication No.8-295223, it is determined on the basis of a varying rate ($\Delta dVw$) of a wheel acceleration as shown in FIGS. 8 and 9 of that publication, whether the changing point of the property (corresponding to the peak) of the coefficient of friction—slip rate characteristic was crossed. According to that apparatus, in the case where the variation around the peak in the road coefficient of friction—slip rate characteristic is large, the peak can be identified. In the case where the variation around the peak is small, however, the varying rate ($\Delta dVw$) of the wheel acceleration is necessarily small, so that it will be difficult to distinguish the peak. This is resulted from not only road conditions, but also tire properties. For example, the variation around the peak in case of a tire without studs (i.e., stud-less tire) is so small that it will be difficult to distinguish the peak.

In the meantime, the aforementioned Japanese Patent Laid-open Publication No.8-150918 never discloses the estimation of the peak in the coefficient of friction—slip rate characteristic, nor suggests it.

SUMMARY OF THE INVENTION

Accordingly, it is an object of the present invention to provide a coefficient of friction peak estimation apparatus for estimating the peak of a coefficient of friction in a coefficient of friction—slip rate characteristic surely.

It is also an object of the present invention to provide an anti-skid control system for estimating the peak of the coefficient of friction surely, and performing a braking force control appropriately on the basis of the estimated peak.

In accomplish the above object, the coefficient of friction peak estimation apparatus includes a wheel acceleration detection device for detecting a wheel acceleration of each wheel of a vehicle, a vehicle acceleration detection device for detecting a vehicle acceleration of the vehicle, and a peak estimation device for estimating the peak of a coefficient of friction in a coefficient of friction—slip rate characteristic. The peak estimation device is adapted to determine that the coefficient of friction is the peak, when the wheel acceleration is lower than the vehicle acceleration, by more than a predetermined difference.

The apparatus for estimating a peak of coefficient of friction may further include a wheel speed detection device for detecting a wheel speed of each wheel of the vehicle. The wheel acceleration detection device may include a wheel acceleration calculating device which differentiates the wheel speed detected by the wheel speed detection device to obtain the wheel acceleration of each wheel of the vehicle, and the vehicle acceleration detection device may include vehicle speed calculating device which calculates an estimated vehicle speed of the vehicle on the basis of the wheel speed of each wheel detected by the wheel speed detection device, and vehicle acceleration calculating device which differentiates the estimated vehicle speed calculated by the vehicle speed calculating device to obtain the vehicle acceleration of the vehicle.

An anti-skid control system for an automotive vehicle may be formed to include a wheel brake cylinder operatively mounted on each wheel of the vehicle, a pressure generating device for pressurizing brake fluid in response to operation of a manually operated member to generate a hydraulic braking pressure and supply the hydraulic braking pressure to the wheel brake cylinder, and a pressure control device disposed between the wheel brake cylinder and the pressure generating device. The pressure control device is provided for controlling the hydraulic braking pressure in the wheel brake cylinder in accordance with a braking condition of the vehicle. In the anti-skid control system, a wheel speed detection device may be provided for detecting a wheel speed of each wheel of the vehicle, and a wheel acceleration calculating device may be provided for differentiating the wheel speed detected by the wheel speed detection device to obtain the wheel acceleration of each wheel of the vehicle. Then, a vehicle speed calculating device may be provided for calculating an estimated vehicle speed of the vehicle on the basis of the wheel speed of each wheel detected by the wheel speed detection device, and a vehicle acceleration calculating device may be provided for differentiating the estimated vehicle speed calculated by the wheel speed calculating device to obtain the vehicle acceleration of the vehicle. And, a peak estimation device is provided for estimating the peak of a coefficient of friction in a coefficient of friction—slip rate characteristic. The peak estimation device is adapted to determine that the coefficient of friction is the peak when the wheel acceleration calculated by the wheel acceleration calculating device is lower than the vehicle acceleration calculated by the vehicle acceleration calculating device, by more than a predetermined difference. Furthermore, a reference speed setting device is provided for setting a reference speed for initiating a pressure decrease mode on the basis of the wheel speed detected by the wheel speed detection device and the estimated vehicle speed calculated by the vehicle speed calculating device, when the peak estimation device estimated the peak of the coefficient of friction. Accordingly, the pressure control device is adapted to be controlled in response to at least the result of comparison between the reference speed set by the reference speed setting device and the wheel speed detected by the wheel speed detection device.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 1:
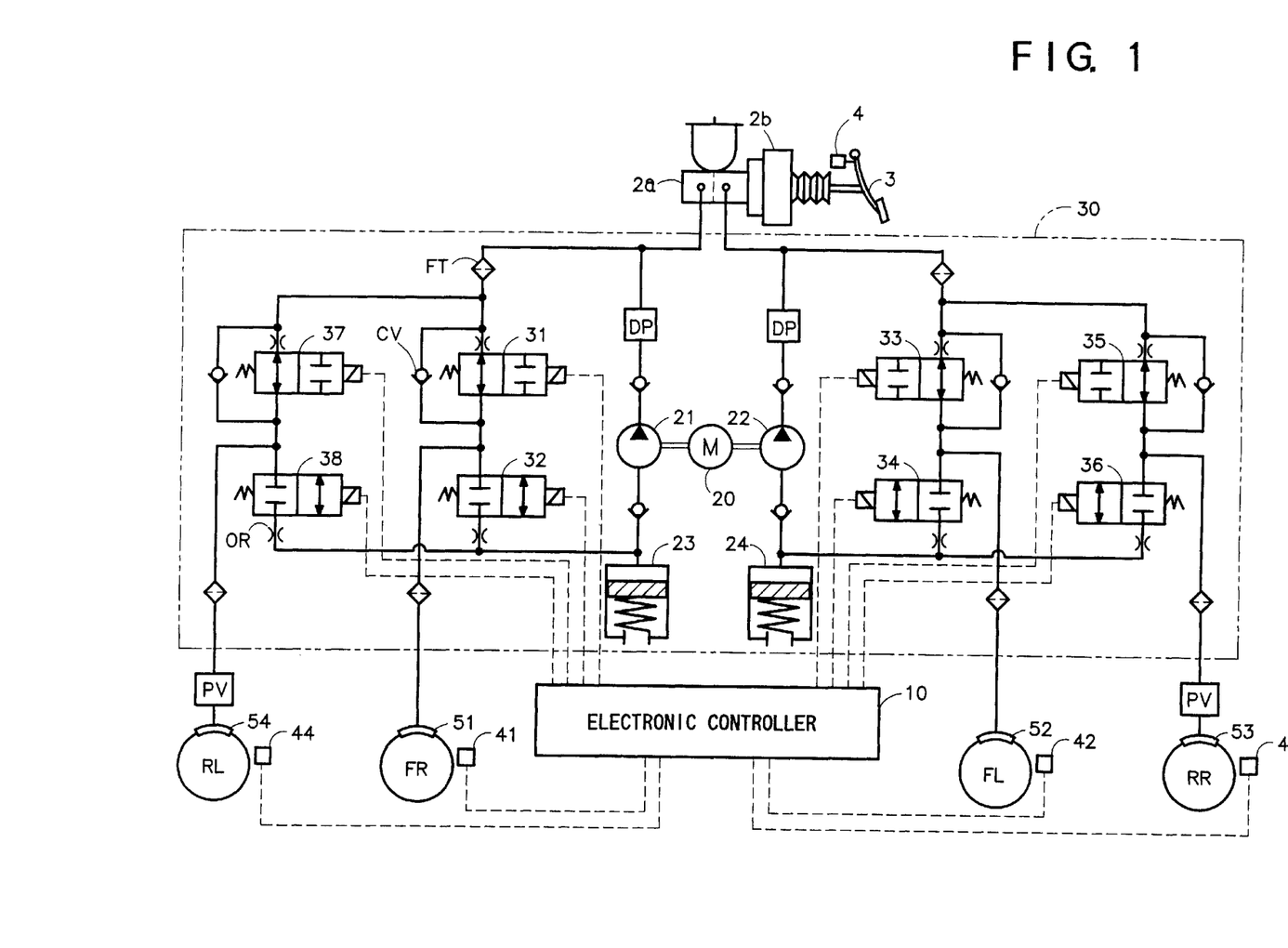
FIG. 1 is a block diagram illustrating an anti-skid control system according to an embodiment of the present invention.

Referring to FIG. 1, there is schematically illustrated an anti-skid control system provided with a coefficient of friction peak estimation apparatus according to an embodiment of the present invention, wherein a master cylinder 2a and a booster 2b are activated by a brake pedal 3 to serve as pressure generating means according to the present invention. Wheel brake cylinders 51 to 54 are operatively mounted on wheels FR, FL, RR, RL of the vehicle, respectively. The wheel FR designates the wheel at the front right side as viewed from the position of a driver's seat, the wheel FL designates the wheel at the front left side, the wheel RR designates the wheel at the rear right side, and the wheel RL designates the wheel at the rear left side. According to the present embodiment, a diagonal circuit (X-circuit) system is formed as shown in FIG. 1, while a front-rear dual circuit system may be formed.

Between the master cylinder 2a and the wheel brake cylinders 51 to 54, an actuator 30 is disposed for use in the anti-skid control (ABS). The actuator 30 serves as pressure control means according to the present invention. As enclosed by a two-dot chain line in FIG. 1, normally open solenoid valves 31, 37 are disposed in hydraulic pressure passages for connecting one output port of the master cylinder 2a with the wheel brake cylinders 51, 54, respectively, and an output port of a hydraulic pressure pump 21 is connected to a position between the master cylinder 2a and the valves 31, 37. Likewise, normally open solenoid valves 33, 35 are disposed in passages for connecting another output port of the master cylinder 2a with the wheel brake cylinders 52, 53, respectively, and an output port of a hydraulic pressure pump 22 is connected to a position between the master cylinder 2a and the valves 33, 35. The hydraulic pressure pumps 21, 22 are driven by an electric motor 20 to supply pressurized brake fluid into each hydraulic pressure passage. The wheel brake cylinders 51, 54 are connected to the normally closed solenoid valves 32, 38, the downstream side of which are connected to a reservoir 23 and the input port of the pump 21. The wheel brake cylinders 52, 53 are connected to the normally closed solenoid valves 34, 36, the downstream side of which are connected to a reservoir 24 and the input port of the pump 22. Each of the reservoirs 23, 24 has a piston and a spring as shown in FIG. 1 to store the brake fluid discharged from the wheel brake cylinders through the solenoid valves 32, 34, 36, 38.

The solenoid valves 31 to 38 are of two-port two-position solenoid operated changeover valves which are placed in their first operating positions as shown in FIG. 1 to communicate the wheel brake cylinders 51 to 54 with the master cylinder 2a. When the solenoids of the valves are energized, they are placed in their second operating positions to block the communication between the wheel brake cylinders 51 to 54 and the master cylinder 2a, and communicate the wheel brake cylinders 51 to 54 with the reservoir 23 or 24. In FIG. 1, "PV" indicates a proportioning valve, "DP" indicates a damper, "CV" indicates a check valve, "OR" indicates an orifice, and "FT" indicates a filter. Each check valve CV is provided for allowing the flow of the brake fluid from the wheel brake cylinders 51 to 54 and reservoirs 23, 24 toward the master cylinder 2a and preventing the reverse flow. With the solenoid valves 31 to 38 controlled to be energized or de-energized, the hydraulic braking pressure in the wheel brake cylinders 51 to 54 will be increased, decreased or held. That is, when the solenoid valves 31 to 38 are de-energized, the hydraulic braking pressure in the master cylinder 2a and the pressure pump 21 or 22 is supplied into the wheel brake cylinders 51 to 54 to increase the hydraulic braking pressure therein, whereas when the solenoid valves 31 to 38 are energized, the wheel brake cylinders 51 to 54 are communicated with the reservoir 23 or 24 to decrease the hydraulic braking pressure in the wheel brake cylinders 51 to 54. Or, when the solenoid valves 31, 33, 35, 37 are energized, and the solenoid valves 32, 34, 36, 38 are de-energized, the hydraulic braking pressure in the wheel brake cylinders 51 to 54 will be held. Therefore, by controlling the time period between the energizing the solenoid valves and de-energizing them, a hydraulic pressure control under a pulse pressure increase mode, or stepped pressure increase mode will be performed to increase the pressure gradually, or may be performed to decrease the pressure gradually.

The solenoid valves 31 to 38 are electrically connected to an electronic controller 10 to energize or de-energize each solenoid valve. The electric motor 20 is also connected to the controller 10 to be controlled thereby. Wheel speed sensors 41 to 44 are mounted on the wheels FR, FL, RR, RL to feed rotational speeds of the wheels, i.e., wheel speed signals to the controller 10, respectively. Furthermore, connected to the controller 10 are a brake switch 4 which is turned on when the brake pedal 3 is depressed, and etc. The electronic controller 10 is provided with a microcomputer (not shown) which includes a central processing unit (CPU), memories (ROM, RAM), a timer, an input interface, an output interface and the like.

Figure 2A:
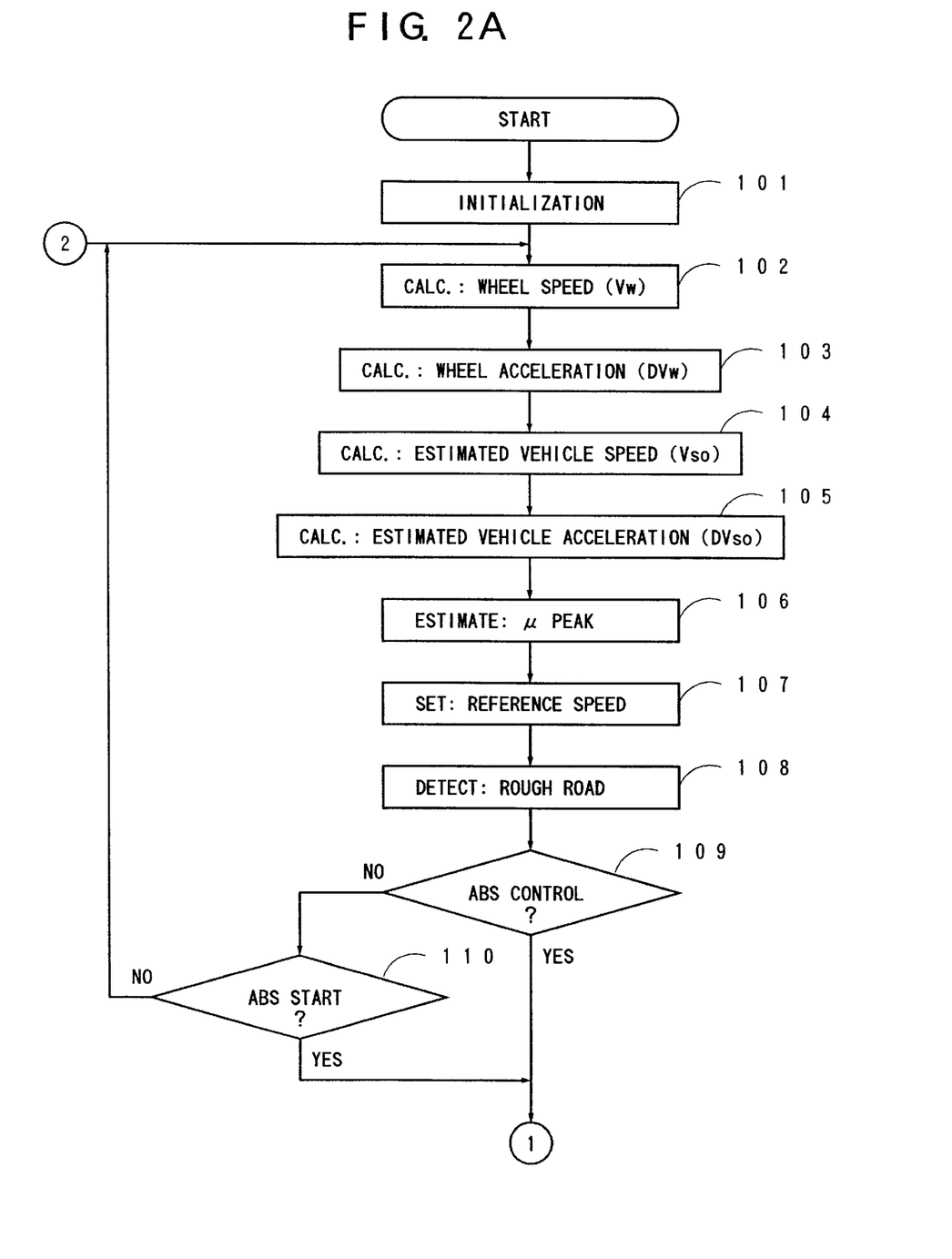
FIG. 2A and FIG. 2B are flowcharts showing a main routine of an anti-skid control according to an embodiment of the present invention.
Figure 2B:
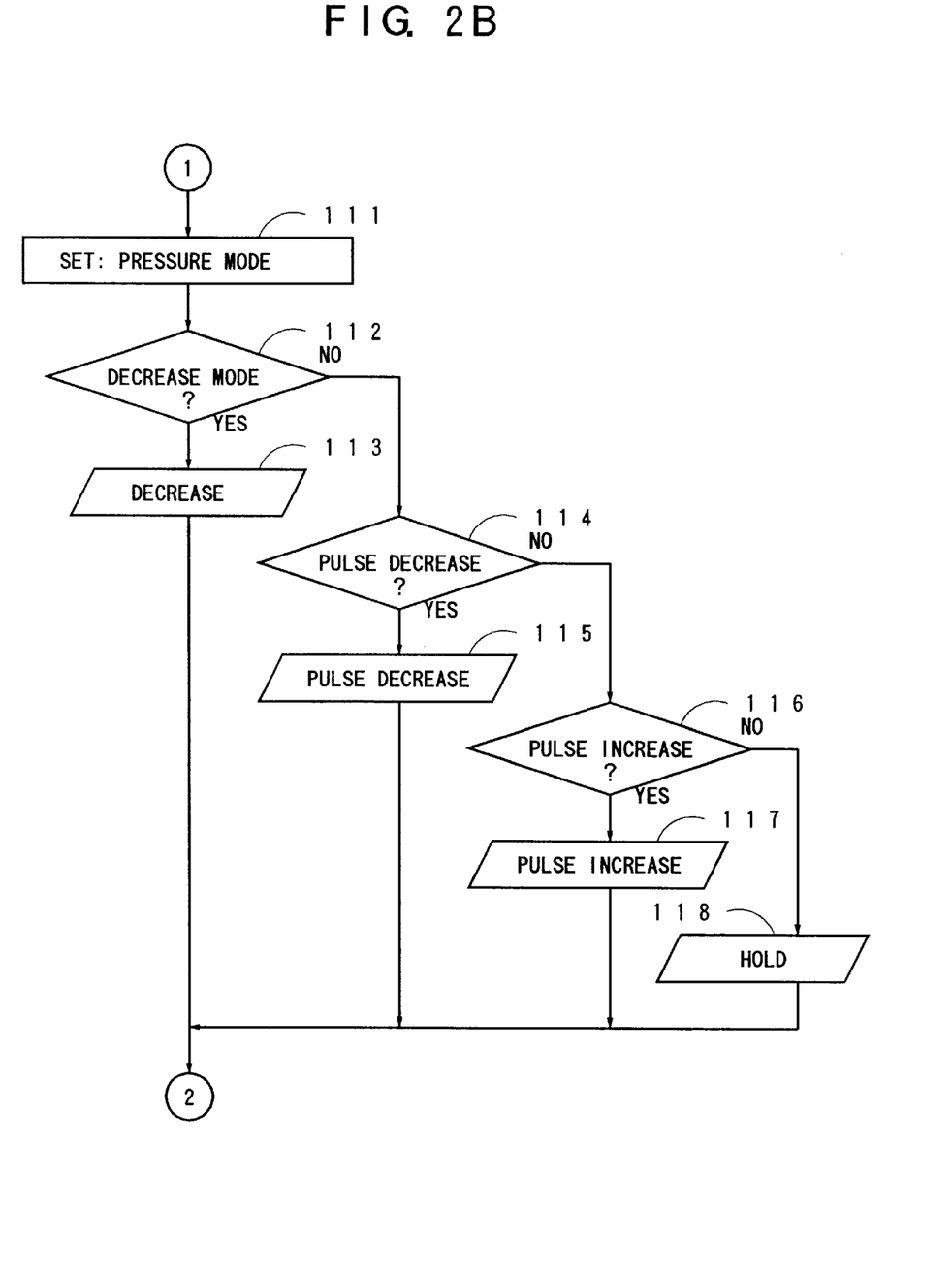

According to the present embodiment as constituted above, the anti-skid control operation will be performed by the controller 10 to control the actuator 30, in accordance with a program as shown in FIGS. 2A, 2B. The program routine starts when an ignition switch (not shown) is turned on. At the outset, the program provides for initialization of the system at Step 101 to clear various data. At Step 102, the signals detected by the wheel speed sensors 41 to 44 are read by the controller 10 to calculate each wheel speed (designated by "Vw"), and differentiated to provide a wheel acceleration (DVw). At Step 104, an estimated vehicle speed (Vso) is calculated on the basis of each wheel speed (Vw). The vehicle speed may be detected directly by a sensor for detecting the speed of the vehicle relative to the ground. Then, the program proceeds to Step 105, where the estimated vehicle speed (Vso) is differentiated to provide an estimated vehicle acceleration (DVso).

Next, the program proceeds to Step 106, where the peak of a coefficient of friction (i.e., $\mu$ peak) is estimated in a coefficient of friction—a slip rate characteristic, as will be described later in detail with reference to FIG. 3. Then, at Step 107, is set a reference wheel speed to be compared with each wheel speed, and at Step 108, is made a determination of a rough road which includes the unpaved road, stone pavement, snow road, and the like. The program further proceeds to Step 109, where it is determined whether the anti-skid control is being performed or not. Unless the anti-skid control is being performed, the program proceeds to Step 110 where a locking condition of each wheel is determined on the basis of the wheel speed (Vw) and wheel acceleration (DVw), for example, so as to determine whether the conditions for initiating the anti-skid operation have been fulfilled or not. If the conditions have been fulfilled, the program proceeds to Step 111 and Steps following it as shown in FIG. 2B, otherwise the program returns to Step 102. Then, at Step 111, one of the pressure modes including the pressure decrease mode, pulse pressure decrease mode, pulse pressure increase mode and hold mode is selected on the basis of the locking condition of each wheel, and the program proceeds to Steps 112–118, where pressure control signals are output in accordance with the selected pressure mode. Accordingly, the solenoid coils of the valves 31 to 38 are energized or de-energized, in accordance with the selected pressure mode, to increase, decrease or hold the hydraulic braking pressure in the wheel brake cylinders 51 to 54 (i.e., wheel cylinder pressure).

Figure 3:
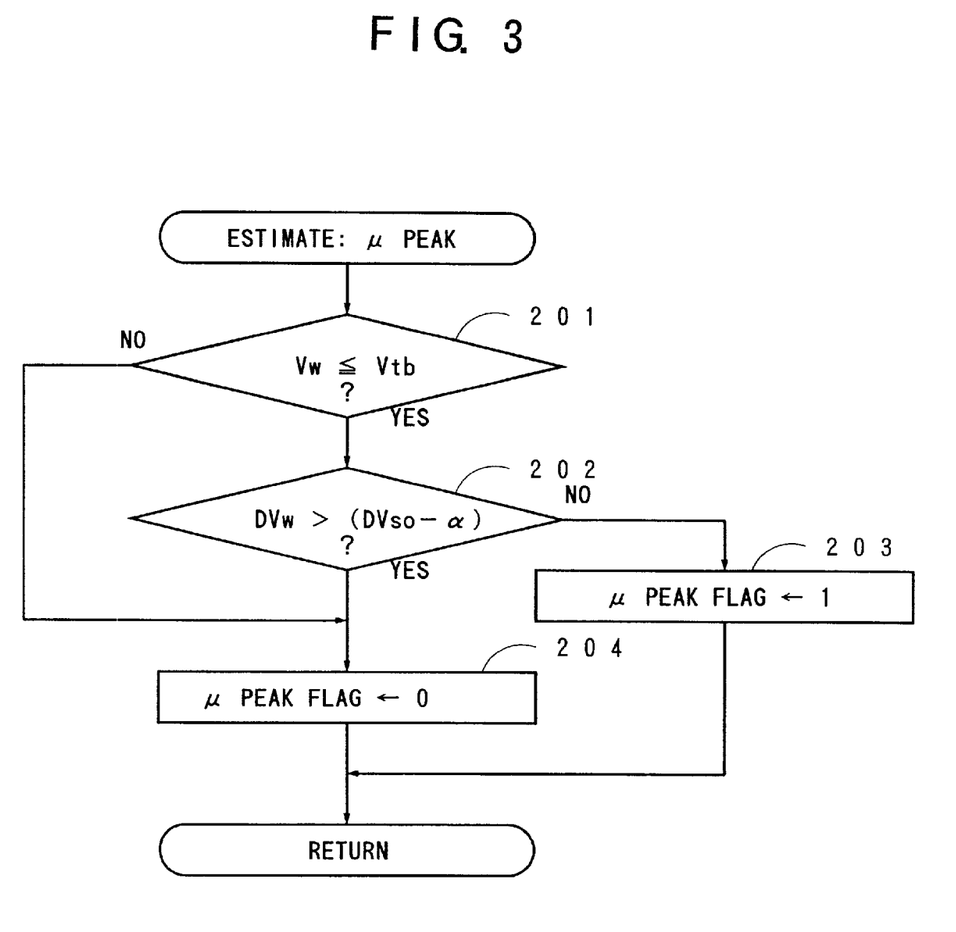
FIG. 3 is a flowchart showing a sub-routine for estimating the $\mu$-peak according to an embodiment of the present invention.

FIG. 3 shows the operation for estimating the $\mu$ peak executed at Step 106 in FIG. 2A. At Step 201, the wheel speed (Vw) is compared with a predetermined reference speed (Vtb), which will be described later. If the wheel speed (Vw) is equal to or lower than the predetermined reference speed (Vtb), the program further proceeds to Step 202, where the wheel acceleration (DVw) is compared with a predetermined reference value (DVso-α), which is obtained by subtracting from the estimated vehicle acceleration (DVso) calculated at Step 105, a constant value (α) which corresponds to a predetermined difference according to the present invention. If it is determined at Step 202 that the wheel acceleration (DVw) is equal to or lower than the reference value (DVso-α), the $\mu$ peak is estimated, so that the program further proceeds to Step 203, where a $\mu$ peak detection flag is set (1). Whereas, if the wheel acceleration (DVw) exceeds the reference value (DVso-α), the program proceeds to Step 204, where the peak detection flag is reset to be zero (0).

Figure 4:
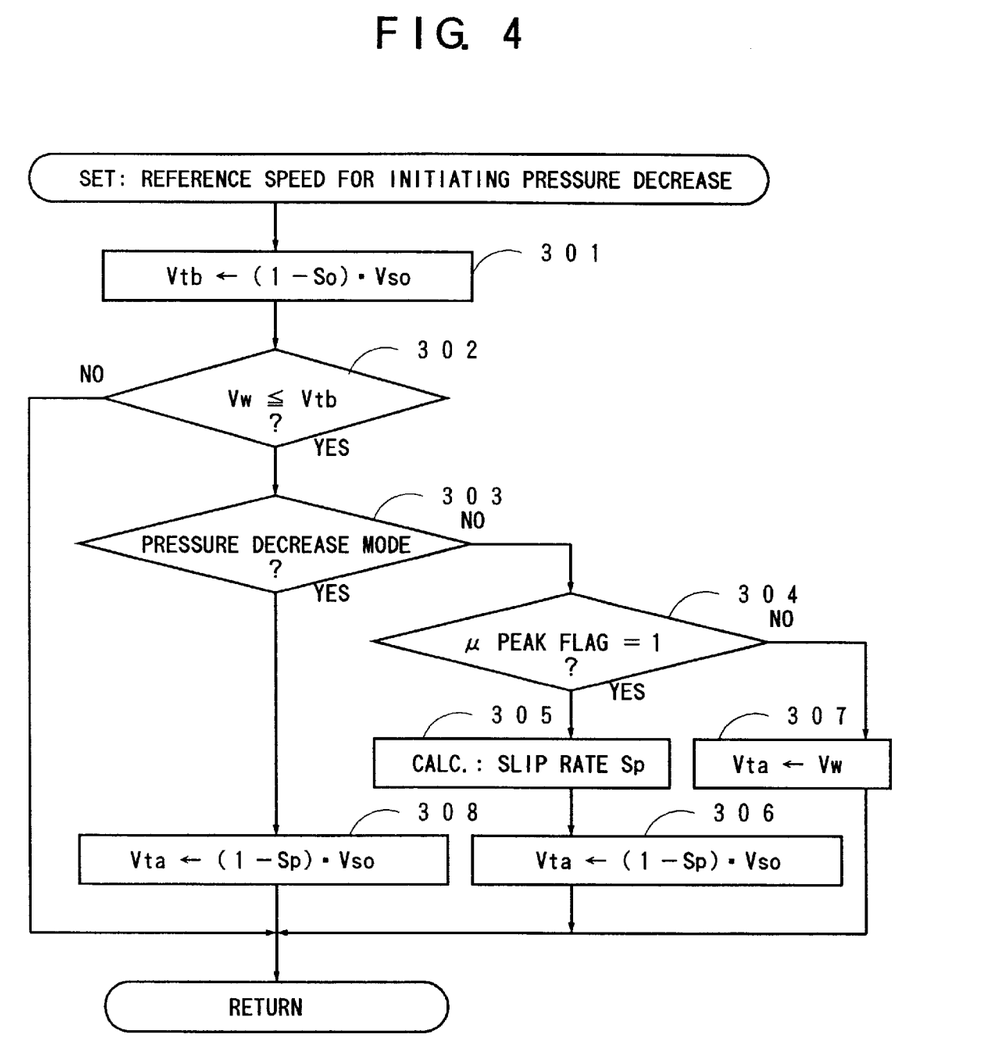
FIG. 4 is a flowchart showing operation of setting a reference speed for initiating the pressure decrease according to an embodiment of the present invention.

FIG. 4 shows the operation for setting a reference speed for initiating the pressure decrease, which constitutes a part of the operation for setting the reference speed executed at Step 107 in FIG. 2A, to obtain a reference speed (Vta) for initiating the pressure decrease mode, which is provided when a wheel is being locked. At the outset, a value of a certain rate (1−So) of the estimated vehicle speed (Vso), i.e., [(1−So)·Vso] is set for the reference speed (Vtb) at Step 301, wherein "So" is a constant value, e.g., 5%. As a result, the reference speed (Vtb) is set to be 95% of the estimated vehicle speed (Vso). Next, at Step 302, the wheel speed (Vw) is compared with the reference speed (Vtb). If the wheel speed (Vw) is equal to or lower than the reference speed (Vtb), the program proceeds to Step 303, where it is determined whether the pressure decrease mode has been set or not. In the case where the pressure decrease mode has not been set, the program proceeds to Step 304, where it is determined whether the $\mu$ peak detection flag in FIG. 3 is set (1) or not. If it is determined that the $\mu$ peak detection flag is set, the program proceeds to Step 305, where a slip rate (Sp) is calculated on the basis of the estimated vehicle speed (Vso) and wheel speed (Vw) which were provided at the time when the $\mu$peak was detected, according to Sp=(Vso−Vw)/Vso. Based upon this slip rate (Sp), the value of the certain rate (1−Sp) of the estimated vehicle speed (Vso), i.e., [(1−Sp) ·Vso] is set for the reference speed (Vta). If it is determined that the $\mu$peak detection flag has not been set, the program proceeds to Step 307, where the wheel speed (Vw) is set for the reference speed (Vta). Whereas, in the case where it is determined at Step 303 that the pressure decrease mode is being performed, the program proceeds to Step 308, where a value of a certain rate (1−Sp) of the estimated vehicle speed (Vso), i.e., [(1−Sp)·Vso] is set for the reference speed (Vta).

Figure 5:
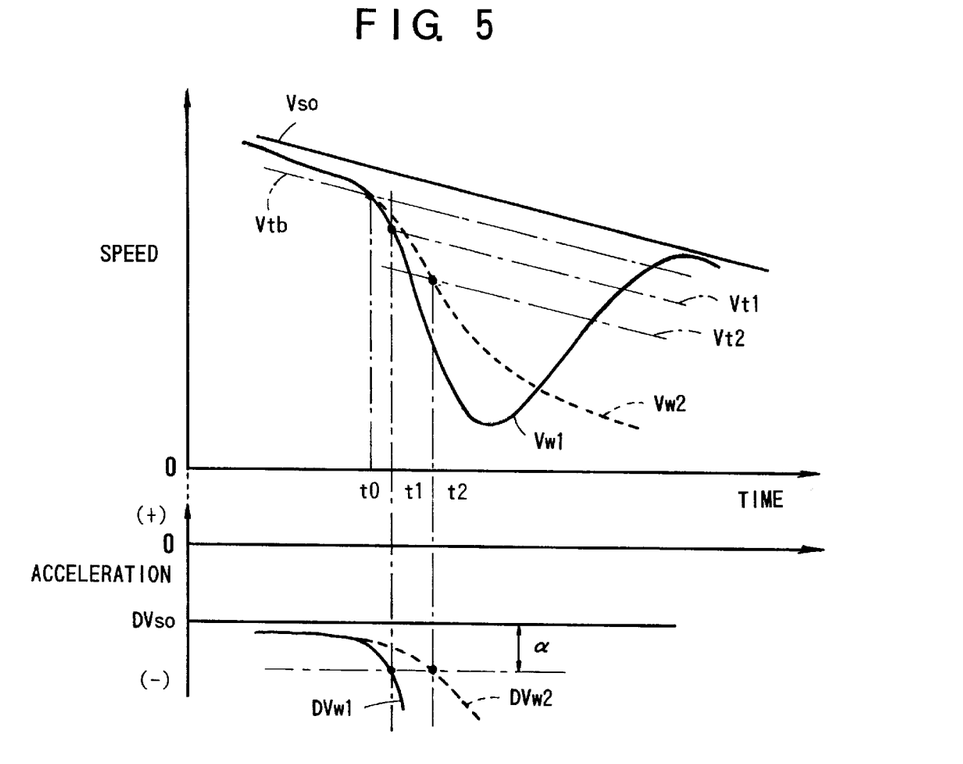
FIG. 5 is a diagram showing a variation of a wheel speed, variation of a wheel acceleration to an estimated vehicle acceleration during an anti-skid control operation according to an embodiment of the present invention, and a reference speed for initiating the pressure decrease set in accordance with the result of estimating the $\mu$-peak.
Figure 6:
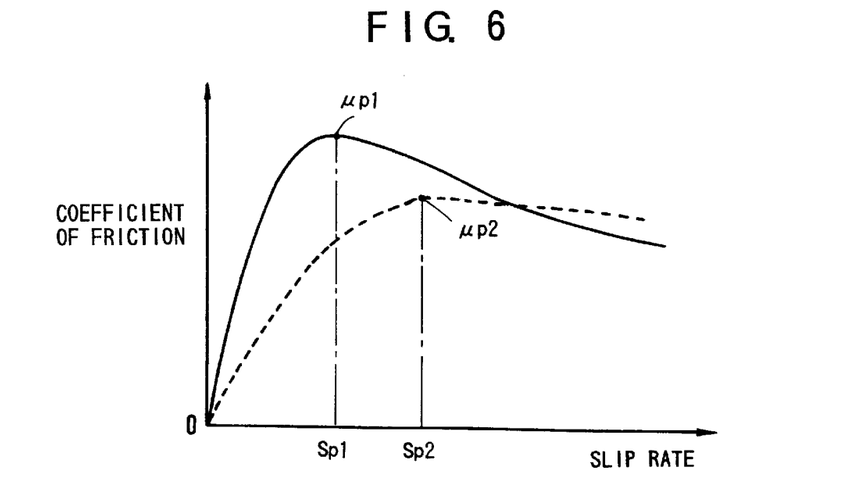
FIG. 6 is a diagram showing variations of wheel speeds having different coefficient of friction—slip rate characteristics according to an embodiment of the present invention.

Next will be described about estimating the $\mu$ peak and setting the reference speed for initiating the pressure decrease mode based upon the estimated $\mu$ peak, with reference to FIGS. 5 and 6. In FIG. 5, the upper section indicates variations of the estimated vehicle speed (Vso) and wheel speed (Vw), and the lower section indicates a variation of the wheel acceleration (DVw) relative to the estimated vehicle acceleration (DVso). A wheel speed (Vw1) of a solid line as shown in FIG. 5 corresponds to the solid line on a diagram of coefficient of friction—slip rate characteristic as shown in FIG. 6, while a wheel speed (Vw2) of a broken line as shown in FIG. 5 corresponds to the broken line as shown in FIG. 6. When the wheel speed (Vw1) of the solid line comes to be equal to or lower than the reference speed (Vtb) at the time of "t0" in FIG. 5, and the wheel acceleration (DVw1) comes to be equal to or lower than a predetermined reference value (DVso- α) at the time of "t1", it is estimated that the slip rate is of a value (Sp1) as shown in FIG. 6, and that the peak of the coefficient of friction is of "$\mu$p1". Whereas, when the wheel speed (Vw2) of the broken line comes to be lower than the reference speed (Vtb) at the time of "t0" in FIG. 5, and the wheel acceleration (DVw2) comes to be equal to or lower than the predetermined reference value (DVso-α) at the time of "t2", it is estimated that the slip rate is of a value (Sp2) as shown in FIG. 6, and that the peak of the coefficient of friction is of "$\mu$p2". Therefore, in the case where a braking operation was made to a vehicle with a stud-less tire, for example, and the coefficient of friction—slip rate characteristic is provided as indicated by the broken line in FIG. 6, the time when the wheel acceleration (DVw2) comes to be equal to or lower than the predetermined reference value (DVso- α) will be delayed, comparing with the time when the wheel acceleration (DVw1) comes to be equal to or lower than the predetermined reference value (DVso- α). This is unavoidable, because it is resulted from the specific characteristic of the stud-less tire. According to the present embodiment, however, the $\mu$ peak of "$\mu$p2" can be distinguished surely, though the $\mu$ peak is not clearly indicated only by the broken line in FIG. 6. Consequently, an appropriate braking control can be made, with the anti-skid control made at a good braking efficiency.

It should be apparent to one skilled in the art that the above-described embodiments are merely illustrative of but one of the many possible specific embodiments of the present invention. Numerous and various other arrangements can be readily devised by those skilled in the art without departing from the spirit and scope of the invention as defined in the following claims.

What is claimed is:

1. An apparatus for estimating the peak of a coefficient of friction in a coefficient of friction—slip rate characteristic, comprising:

wheel acceleration detection means for detecting a wheel acceleration of each wheel of a vehicle;

vehicle acceleration detection means for detecting a vehicle acceleration of said vehicle; and peak estimation means for estimating the peak of the coefficient of friction, said peak estimation means determining that the coefficient of friction is the peak, when the wheel acceleration detected by said wheel acceleration detection means is lower than the vehicle acceleration detected by said vehicle acceleration detection means, by more than a predetermined difference.

2. The apparatus as claimed in claim 1, further comprising;

wheel speed detection means for detecting a wheel speed of each wheel of said vehicle, wherein said wheel acceleration detection means includes wheel acceleration calculating means for differentiating the wheel speed detected by said wheel speed detection means to obtain the wheel acceleration of each wheel of said vehicle, and wherein said vehicle acceleration detection means includes vehicle speed calculating means for calculating an estimated vehicle speed of said vehicle on the basis of the wheel speed of each wheel detected by said wheel speed detection means, and includes vehicle acceleration calculating means for differentiating the estimated vehicle speed calculated by said vehicle speed calculating means to obtain the vehicle acceleration of said vehicle.

3. An anti-skid control system for an automotive vehicle, comprising:

a wheel brake cylinder operatively mounted on each wheel of said vehicle;

pressure generating means for pressurizing brake fluid in response to operation of a manually operated member to generate a hydraulic braking pressure and supply the hydraulic braking pressure to said wheel brake cylinder;

pressure control means disposed between said wheel brake cylinder and said pressure generating means, said pressure control means controlling the hydraulic braking pressure in said wheel brake cylinder in accordance with a braking condition of said vehicle;

wheel speed detection means for detecting a wheel speed of each wheel of said vehicle;

wheel acceleration detection means for detecting a wheel acceleration of each wheel of said vehicle;

vehicle acceleration detection means for detecting a vehicle acceleration of said vehicle;

peak estimation means for estimating the peak of a coefficient of friction in a coefficient of friction—slip rate characteristic, said peak estimation means determining that the coefficient of friction is the peak when the wheel acceleration detected by said wheel acceleration detection means is lower than the vehicle acceleration detected by said vehicle acceleration detection means, by more than a predetermined difference; and reference speed setting means for setting a reference speed for initiating a pressure decrease mode on the basis of the wheel speed detected by said wheel speed detection means and the vehicle speed detected by said vehicle speed detection means when said peak estimation means estimated the peak of the coefficient of friction, said pressure control means being controlled in response to at least the result of comparison between the reference speed set by said reference speed setting means and the wheel speed detected by said wheel speed detection means.

4. The anti-skid control system as claimed in claim 3, wherein said wheel acceleration detection means includes wheel acceleration calculating means for differentiating the wheel speed detected by said wheel speed detection means to obtain the wheel acceleration of each wheel of said vehicle, and wherein said vehicle acceleration detection means includes vehicle speed calculating means for calculating an estimated vehicle speed of said vehicle on the basis of the wheel speed of each wheel detected by said wheel speed detection means, and includes vehicle acceleration calculating means for differentiating the estimated vehicle speed calculated by said vehicle speed calculating means to obtain the vehicle acceleration of said vehicle, and wherein said reference speed setting means sets the reference speed for initiating the pressure decrease mode on the basis of the wheel speed detected by said wheel speed detection means and the estimated vehicle speed calculated by said vehicle speed calculating means when said peak estimation means estimated the peak of the coefficient of friction.

* * * * *